United States Patent
Whiteman (10) Patent No.: US 11,739,756 B2
(45) Date of Patent: Aug. 29, 2023

(54) MULTI-PUMP APPARATUS OF COOLING SYSTEM

(71) Applicant: DEERE & COMPANY, Moline, IL (US)

(72) Inventor: Steven R. Whiteman, Asbury, IA (US)

(73) Assignee: DEERE & COMPANY, Moline, IL (US)

( * ) Notice: Subject to any disclaimer, the term of this patent is extended or adjusted under 35 U.S.C. 154(b) by 157 days.

(21) Appl. No.: 17/106,366

(22) Filed: Nov. 30, 2020

(65) Prior Publication Data

US 2022/0170467 A1    Jun. 2, 2022

(51) Int. Cl.

| | |
|---|---|
| *F04D 13/02* | (2006.01) |
| *B60K 11/02* | (2006.01) |
| *F04D 29/58* | (2006.01) |
| *F04D 29/52* | (2006.01) |
| *F04D 13/12* | (2006.01) |
| *F04D 25/16* | (2006.01) |
| *F04D 13/06* | (2006.01) |
| *F04D 25/02* | (2006.01) |
| *F04D 29/60* | (2006.01) |
| *F04D 29/42* | (2006.01) |

(52) U.S. Cl.
CPC .......... *F04D 13/024* (2013.01); *B60K 11/02* (2013.01); *F04D 13/12* (2013.01); *F04D 25/16* (2013.01); *F04D 29/528* (2013.01); *F04D 29/5806* (2013.01); *F04D 13/06* (2013.01); *F04D 25/026* (2013.01); *F04D 29/426* (2013.01); *F04D 29/5873* (2013.01); *F04D 29/605* (2013.01)

(58) Field of Classification Search
CPC .. F04D 13/024; F04D 25/026; F04D 29/5833; F04D 29/5873
See application file for complete search history.

(56) References Cited

U.S. PATENT DOCUMENTS 3,470,406 A * 9/1969 Law ................... H02K 11/225
                                                73/507
6,170,286 B1   1/2001 Keuper
(Continued)

FOREIGN PATENT DOCUMENTS

| DE | 3909671 A1 | 10/1989 |
|---|---|---|
| EP | 2232026 B1 | 8/2012 |
| KR | 101781747 B1 | 9/2017 |

OTHER PUBLICATIONS

Pumped Two Phase Cooling, dated Feb. 27, 2019, pp. 1-22, Advanced Cooling Technologies.
(Continued)

*Primary Examiner* — Nathan C Zollinger
*Assistant Examiner* — Timothy P Solak (57) ABSTRACT

A multi-pump apparatus of a work vehicle may include a main housing, a motor shaft, a water pump, and a refrigerant pump. The main housing has a first housing portion and a second housing portion coupled to the first housing portion. The motor shaft is positioned through the first housing portion. The water pump is coupled to the first housing portion and is operable to pump coolant. The water pump is driven by the motor shaft. The refrigerant pump is coupled to the second housing portion and is operable to pump refrigerant. The refrigerant pump is also driven by the motor shaft.

11 Claims, 5 Drawing Sheets

(56) References Cited

U.S. PATENT DOCUMENTS

| | | | |
|---|---|---|---|
| 6,533,540 B1* | 3/2003 | Mathis | F04D 29/126 |
| | | | 415/174.3 |
| 8,272,353 B2* | 9/2012 | Dincer | F02M 21/0227 |
| | | | 123/3 |
| 8,839,894 B2 | 9/2014 | Yokoyama et al. | |
| 9,000,724 B2 | 4/2015 | Minami | |
| 10,138,842 B2* | 11/2018 | Mizoguchi | F01K 23/065 |
| 2001/0037798 A1 | 11/2001 | Hakansson et al. | |
| 2005/0103286 A1* | 5/2005 | Ji | F16H 57/0434 |
| | | | 123/196 R |
| 2009/0022607 A1* | 1/2009 | Jordan | F04D 29/059 |
| | | | 417/420 |
| 2014/0050602 A1* | 2/2014 | Muizelaar | F01P 5/12 |
| | | | 417/410.1 |
| 2014/0271123 A1 | 9/2014 | Rosinski | |
| 2014/0318749 A1* | 10/2014 | Katoh | B60H 1/00328 |
| | | | 165/151 |
| 2014/0331701 A1 | 11/2014 | James | |
| 2015/0308435 A1 | 10/2015 | Rosinski et al. | |
| 2016/0265598 A1 | 9/2016 | Kruger et al. | |
| 2016/0281712 A1* | 9/2016 | Muizelaar | F04C 11/008 |
| 2018/0118014 A1 | 5/2018 | Wantschik | |
| 2020/0309467 A1 | 10/2020 | Whiteman et al. | |

OTHER PUBLICATIONS

German Search Report issued in application No. DE102021211972.7 dated Nov. 9, 2022 (08 pages).

* cited by examiner

FIG. 5

MULTI-PUMP APPARATUS OF COOLING SYSTEM

RELATED APPLICATIONS

N/A

FIELD OF THE DISCLOSURE

The present disclosure relates generally to a multi-pump apparatus of a work vehicle.

BACKGROUND OF THE DISCLOSURE

Internal combustion engine vehicles, electric vehicles, and hybrid vehicles may all need their respective water pumps to circulate coolant passing through vehicle components (heat loads), even though the water pumps' layout may be different. The coolant can be the water or the antifreeze fluid, which is a mixture of the water and antifreeze chemicals such as ethylene glycol or propylene glycol. When a work vehicle is an internal combustion engine vehicle, the coolant may be used to cool the engine.

When a work vehicle is an electric vehicle, the coolant may be used to cool electrical components. The coolant absorbing the heat of the vehicle component may later enter a radiator to dissipate the heat. An air flow passing through the radiator will extract the heat, such that the coolant can again absorb the heat from the vehicle components.

SUMMARY OF THE DISCLOSURE

According to an aspect of the present disclosure, a multi-pump apparatus of a work vehicle may include a main housing, a motor shaft, a water pump, and a refrigerant pump. The main housing has a first housing portion and a second housing portion coupled to the first housing portion. The motor shaft is positioned through the first housing portion. The water pump is coupled to the first housing portion and is operable to pump coolant. The water pump is driven by the motor shaft. The refrigerant pump is coupled to the second housing portion and is operable to pump refrigerant. The refrigerant pump is also driven by the motor shaft.

According to an aspect of the present disclosure, a cooling system for a work vehicle includes a multi-pump apparatus, a pressure reducer, a primary heat exchanger, a condenser, and at least one vehicle component. The multi-pump apparatus may include a main housing, a motor shaft, a water pump, and a refrigerant pump. The main housing has a first housing portion and a second housing portion coupled to the first housing portion. The motor shaft is positioned through the first housing portion. The water pump is coupled to the first housing portion and is operable to pump coolant. The water pump is driven by the motor shaft. The refrigerant pump is coupled to the second housing portion and is operable to pump refrigerant. The refrigerant pump is also driven by the motor shaft. The pressure reducer receives the refrigerant from the refrigerant pump and is operable to reduce the pressure of the refrigerant so as to decrease the temperature thereof. The primary heat exchanger has a first unit and a second unit. The first unit is operable to receive the refrigerant from the pressure reducer. The condenser is positioned downstream of the first unit of the primary heat exchanger and is operable to cool the refrigerant into liquid form. The vehicle component receives the coolant from the water pump to discharge heat. The second unit of the primary heat exchanger is positioned downstream of the vehicle component. The second unit of the primary heat exchanger is operable to absorb heat from the vehicle component and to discharge heat to the first unit of the primary heat exchanger.

Other features and aspects will become apparent by consideration of the detailed description and accompanying drawings.

BRIEF DESCRIPTION OF THE DRAWINGS

The detailed description of the drawings refers to the accompanying figures.

DETAILED DESCRIPTION OF THE DRAWINGS

Figure 1:
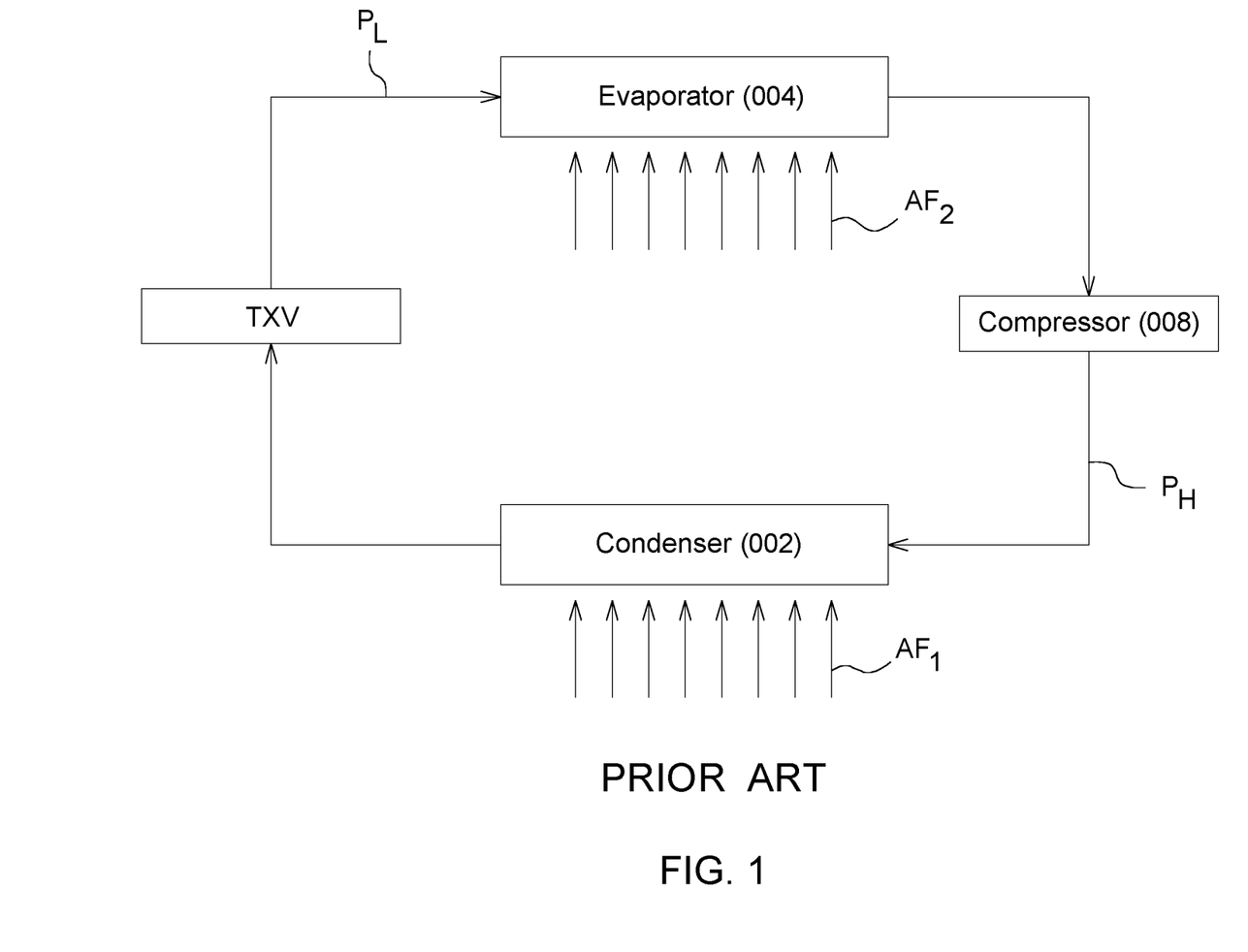
FIG. 1 is a schematic view illustrating a cooling system having a compressor.

Referring to FIG. 1, a cooling system applied on an air conditioner includes an evaporator 004, a compressor 008, a condenser 002, and a thermal expansion valve (TXV), where refrigerant flows through in liquid and/or in vapor form at different pressures. The air conditioner normally is fixed on a wall of a house and some elements of the air condition are indoor and some are outdoor. In general, the compressor 008 and the condenser 002 of the air conditioner are positioned in the outdoor environment; the thermal expansion valve (TXV) and the evaporator 004 are positioned indoor environment. The evaporator 004 is located in the low pressure side (compressor suction side) and the condenser 002 is used in the high pressure side. The thermal expansion valve (TXV) is used between the condenser 002 and the evaporator 004 to reduce pressure.

In a path (suction line) between the evaporator 004 and the compressor 008, the refrigerant is at a low pressure and low temperature. In order to run the compressor 008 properly, the refrigerant is in vapor form (gas or superheat gas). When the refrigerant reaches the compressor 008, the compressor 008 compresses the refrigerant in vapor form, such that the refrigerant in a path between the compressor 008 and the condenser 002 is at a high pressure ($P_H$) and high temperature (may be superheat). When the refrigerant reaches condenser 002, the condenser 002 cools the temperature of the refrigerant and change it into liquid form via a fan (not shown). The fan provides a first air flow $AF_1'$ passing through a heat dissipation element of the condenser 002 to remove the heat from the condenser 002. Refrigerant at the exit of the condenser 002 must be saturated or subcooled liquid for smooth operation of thermal expansion valve (TXV). In a path between the condenser 002 and the thermal expansion valve (TXV), the refrigerant is still at the high pressure.

The thermal expansion valve (TXV) later collects the refrigerant from the condenser 002. In the thermal expansion valve (TXV), the pressure of the refrigerant drastically decreases. The temperature of the refrigerant may also drop. Therefore, in a path between the thermal expansion valve (TXV) and the evaporator 004, the refrigerant is at a low pressure ($P_L$). The low pressure refrigerant flows into the evaporator 004. Another fan (not shown) adjacent to the evaporator 004 provides a second air flow $AF_2'$ (indoor) passing through a heat exchange element of the evaporator 004. The heat of the second air flow $AF_2'$ is absorbed by the refrigerant, because refrigerant in liquid form changing into vapor form requires latent heat (energy potential). Again, the refrigerant is discharged by the evaporator 004 and flows into the compressor 008.

Figure 2:
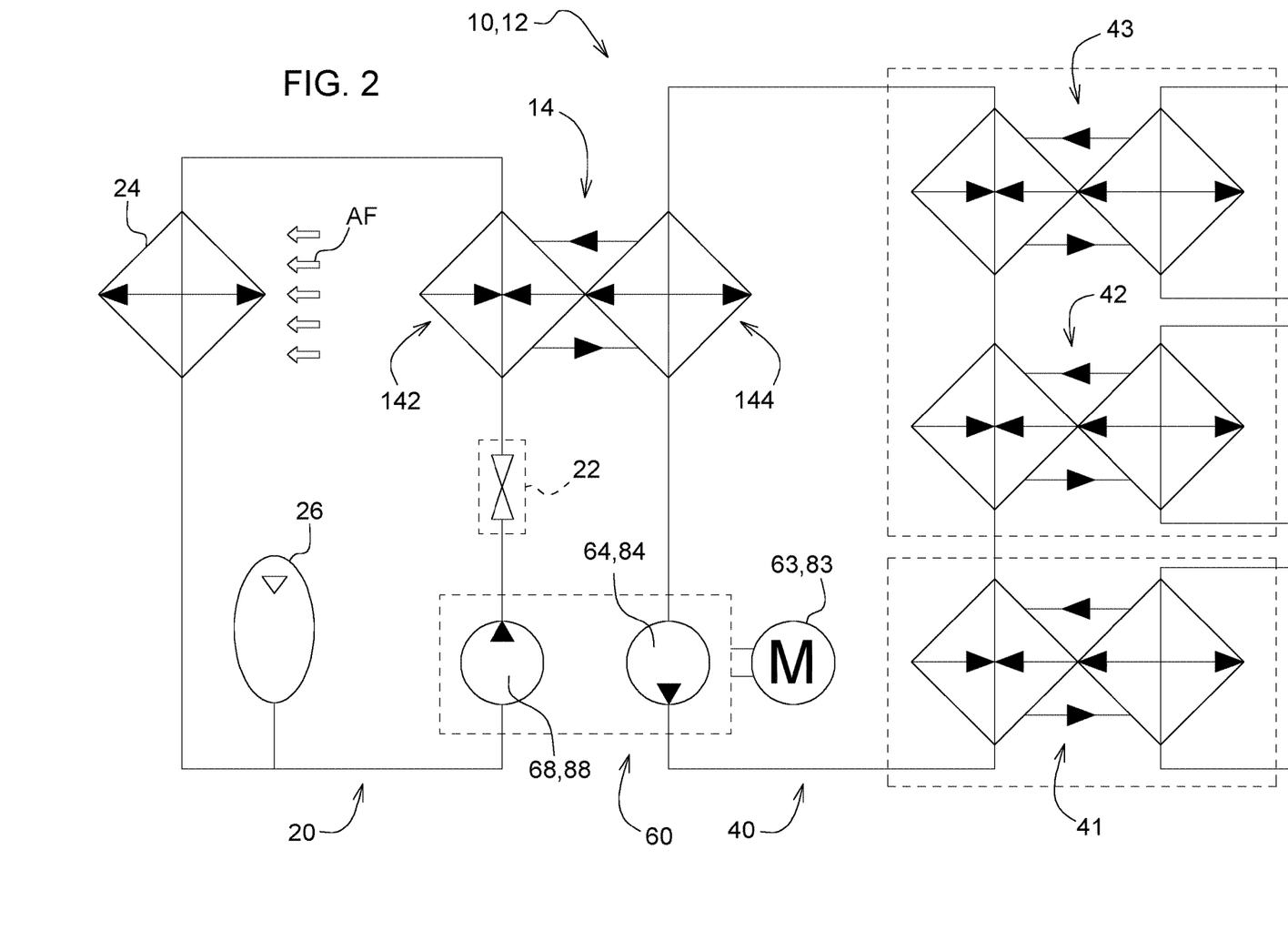
FIG. 2 is a schematic view for a cooling system having a refrigerant circuit and a coolant circuit, which has heat load exchangers connected in series.

FIG. 2 illustrate a cooling system 12 of a work vehicle 10. The cooling system 12 includes a refrigerant circuit 20, a coolant circuit 40, and a multi-pump apparatus 60 operable to pump a refrigerant in the refrigerant circuit 20 and to pump a coolant in the coolant circuit 40. The cooling system 12 may further include a primary heat exchanger 14 operable to extract heat from the coolant circuit 40 to discharge it to the refrigerant circuit 20. The cooling system 12 may be used to absorb heat from different vehicle elements, including transmissions, axles, electrical component, hydraulic pumps and/or motors. When the work vehicle 10 is an electric vehicle, the electrical component may include but is not limited to a motor, an accessory, a battery unit, an inverter, and/or a converter. The battery unit may include a traction battery pack, a DC converter, and auxiliary battery pack. With the flowing of electricity, the temperature of the electrical component increases.

As to the refrigerant circuit 20, unlike the conventional cooling system having the compressor 008 to create a high system pressure, it uses a pump (refrigerant pump 68, 88) to circulate the refrigerant. Compared with the conventional cooling system, the refrigerant circuit 20 has lower system pressure.

The refrigerant circuit 20 may include a refrigerant pump 68, 88 of the multi-pump apparatus 60, 80, pressure reducer 22, a first unit (evaporator) 142 of the primary heat exchanger 14, and a condenser 24. The refrigerant pump 68, 88 is operable to pump the refrigerant from the condenser 24 to the first unit (evaporator) 142, such that the first unit 142 is downstream of the refrigerant pump 68, 88 and the condenser 24 is downstream of the first unit 142. The pressure reducer 22 reduces the pressure of the refrigerant and decreases its boiling point. Some of the refrigerant in liquid form changes to vapor form and the temperature of the refrigerant (liquid form and vapor form) decreases. The refrigerant then enters the first unit 142 of the primary heat exchanger 14 to absorb the heat from the coolant circuit 40 through the second unit 144 of the primary heat exchanger 14. More refrigerant in liquid form changes to be in vapor form during the heat exchange between the first unit 142 and the second unit 144. The refrigerant then enters the condenser 24. The air flow AF cool the refrigerant and at least some of the refrigerant in vapor form changes to liquid form.

Optionally, the refrigerant circuit 20 may also include a separator 26 positioned between the condenser 24 and the refrigerant pump 68, 88. The separator 26 separates the refrigerant in liquid form from the refrigerant in vapor form such that only the refrigerant in liquid form will be pumped by the refrigerant pump 68, 88. When the refrigerant pump 68, 88 is a rotary type positive displacement pump, such as a gear pump, the separator 26 may help the refrigerant pump 68, 88 avoid cavitation.

Figure 3:
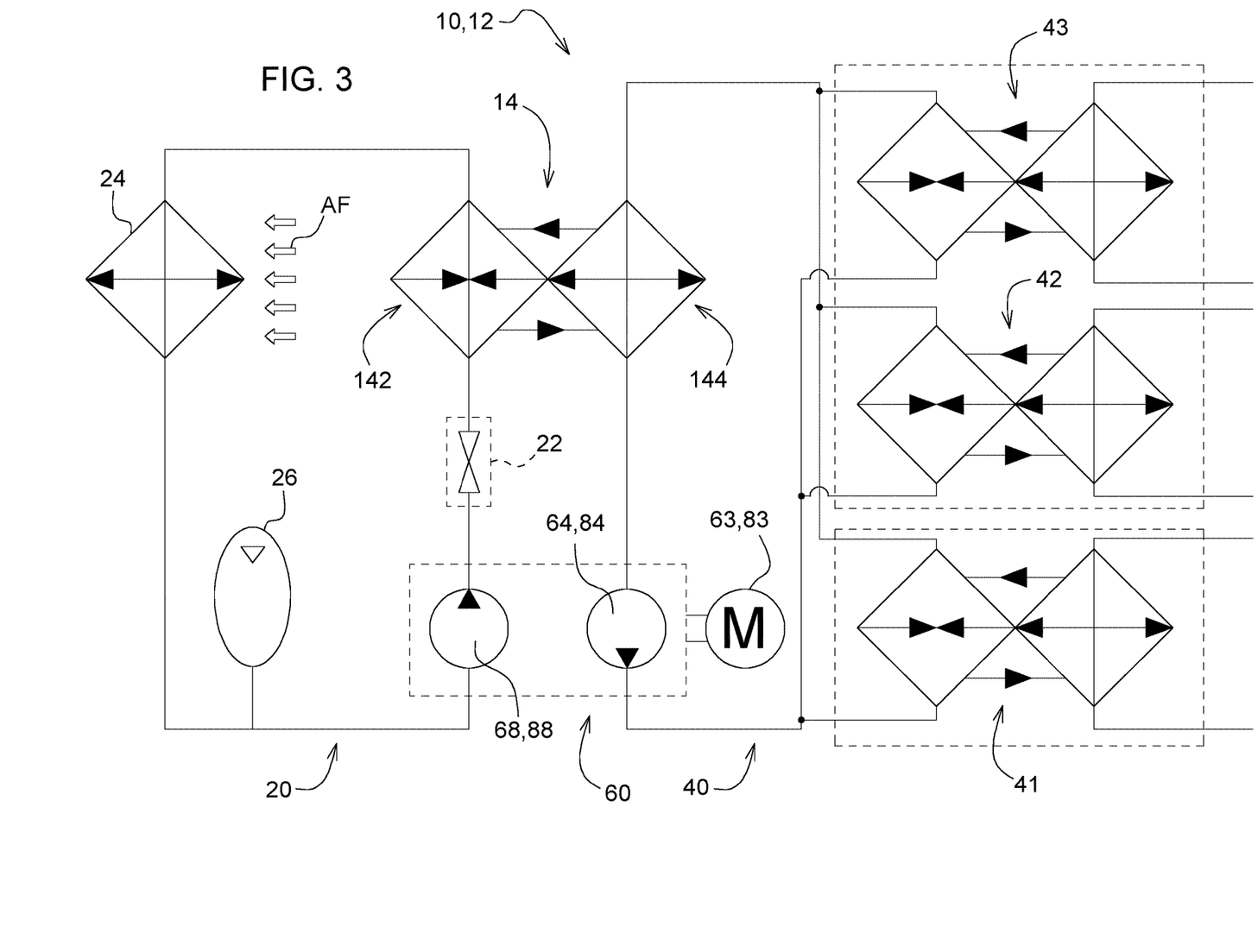
FIG. 3 is a schematic view for another cooling system having a refrigerant circuit and a coolant circuit, which has heat load exchangers connected in parallel.

The coolant circuit 40 may include a water pump 64, 84, at least one heat load exchanger, and the second unit 144 of the primary heat exchanger 14. The water pump 64, 84 is operable to circulate the coolant. The coolant pumped by the water pump 64, 84 enters the at least one heat load exchanger and absorbs heat from heat loads (vehicle elements). The coolant later enters the second unit 144 of the primary heat exchanger 14 so as to dissipate the heat. The heat load exchanger may be used to cool the vehicle elements such as transmissions, axles, battery unit, hydraulic pumps and motors. In this implementation, the at least one heat load exchanger include a first heat load exchanger 41, a second heat load exchanger 42, and a third heat load exchanger 43. The first heat load exchanger 41, for example, may be used to dissipate the heat of the battery unit if the work vehicle 10 is an electrical or a hybrid vehicle, and the first heat load exchanger 41 is positioned upstream of the second and the third heat load exchangers 42, 43. FIG. 2 illustrates the first heat load exchanger 41, the second heat load exchanger 42, and the third heat load exchanger 43 connected in series; however in other implementation, the heat load exchangers may be connected in different fashions. For example, FIG. 3 illustrates the first heat load exchanger 41, the second heat load exchanger 42, and the third heat load exchanger 43 connected in parallel. There may be flow control valves (not shown) controlling the volume of the coolant entering the first heat load exchanger 41, the second heat load exchanger 42, and the third heat load exchanger 43. The coolant circuit 40 may also need a surge tank (not shown) operable to store excessive coolant and to discharge it when the coolant circuit 40 needs more coolant. It is noted that the coolant pumped by the water pump is not limited to water, antifreeze fluid (glycol), or other types of fluid.

Figure 4:
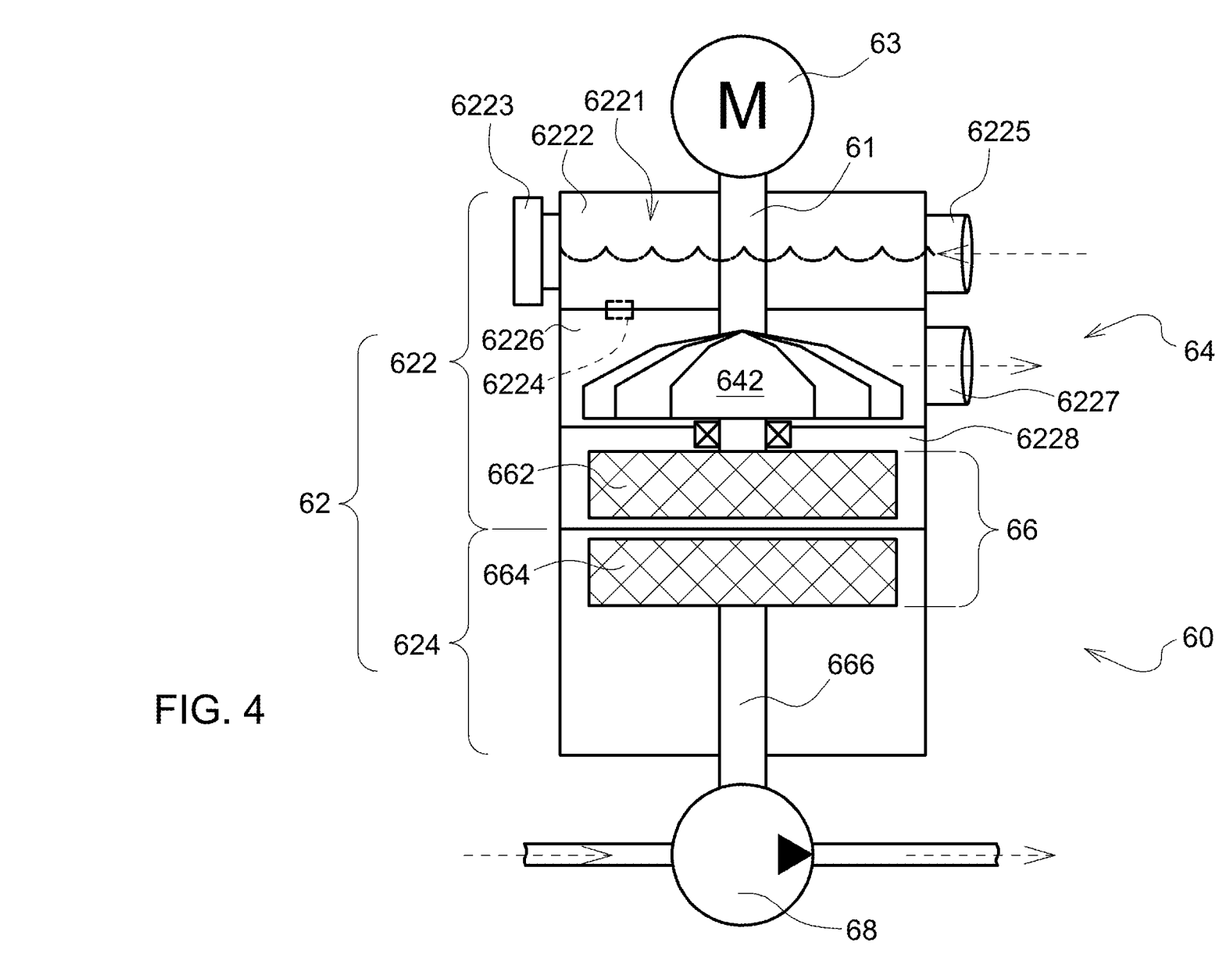
FIG. 4 is a cross-sectional view illustrating a multi-pump apparatus in one implementation.

Referring to FIG. 4, the multi-pump apparatus 60 of a work vehicle 10 in one implementation may include a motor shaft 61, a main housing 62, a water pump 64, and a refrigerant pump 68. The multi-pump apparatus 60 has an in-line configuration that allows for optimized inlet conditions for the water pump 64. The multi-pump apparatus 60 may be coupled to or include a motor 63 rotating the motor shaft 61. The motor 63 in this implementation is an electric motor. The main housing 62 has a first housing portion 622 and a second housing portion 624 coupled to the first housing portion 622. In this implementation, the first housing portion 622 and the second housing portion 624 are arranged in a vertical orientation and the motor shaft 61 rotates about an axis parallel to the vertical orientation.

The first housing portion 622 includes an upper compartment 6222 and a lower compartment 6226 under the upper compartment 6222. The upper compartment 6222 and the lower compartment 6226 of the first housing portion 622 cooperate to receive the coolant. The baffle 6224 is positioned between the upper compartment 6222 and the lower compartment 6226 so as to control a communication of the coolant between the upper compartment 6222 and the lower compartment 6226.

The upper compartment 6222 is operable to receive the coolant from a water pump inlet 6625 to increase a fluid pressure. The upper compartment 6222 and a surface of the coolant fluid defines a space 6221 within the upper compartment 6222. A pressure cap 6223 is coupled to the upper compartment 6222 and may be used to change the volume of the coolant, the fluid pressure, and/or the air pressure within the space 6221.

The motor shaft 61 is positioned through the first housing portion 622. The water pump 64 is coupled to or has the first housing portion 622. The water pump 64 includes a water pump impeller 642 driven by the motor shaft 61. The water pump impeller 642 is positioned within the lower compartment 6226 and therefore is submerged in the coolant. The lower compartment 6226 includes a water pump outlet 6227 for the coolant flowing out of the water pump 64. The coolant later enters first heat load exchanger 41, the second heat load exchanger 42, and/or the third heat load exchanger 43 as shown in FIG. 2 or FIG. 3. The lower compartment 6226 has a volute configuration/volute casing (not shown) that may gradually increase its area as the volute configuration approaches to the water pump outlet 6227. Housed within the volute configuration, the water pump impeller 642 rotates with the motor shaft 61 to discharge the coolant.

The water pump 64, together with the first housing portion 622 provide multiple functions for the coolant circuit 40 other than pumping the coolant. The coolant circuit 40 may not need a separate surge tank or overflow bottle in this implementation. The combination of the upper compartment 6222 and the lower compartment 6226 stores the coolant, prevents the surge of the coolant, and provides a pressurized coolant when the level (volume) of the coolant increases. Sinking the water pump impeller 642 inside the pressurized lower compartment 6226 with antifreeze (glycol) improves a pump condition and avoid pump cavitation. During the operation of the water pump 64, bubbles of the coolant will be created. Due to buoyancy, the bubbles of the coolant within the upper compartment 6222 will be buoyed to the surface of the upper compartment 6222. The bubbles will only be collected in the upper compartment 6222. In this regard, the water pump impeller 642 located within the lower compartment 6226 will not pump the bubbles and the life of the water pump 64 and other components of the coolant circuit 40 will increase. When the motor shaft 61 rotates, a temperature of the first housing portion 622 increases and an air pressure of the space 6221 increases. Because of the level of the coolant and the air pressure of the space 6221, the boiling point of the coolant will increase so as to prevent the coolant from being vaporized. The fluid pressure and the air pressure may also inhibit the formation of the bubbles that cause pump cavitation.

The multi-pump apparatus 60 may also include a magnetic coupling 66 operable to transfer a portion of a power from the motor shaft 61 to the refrigerant pump 68. As shown in FIG. 4, the magnetic coupling 66 includes a driving element 662 and a driven element 664. The driving element 662 is positioned within the first housing portion 622 and the driven element 664 is positioned within the second housing portion 624. The first housing portion 622 may include a magnet compartment 6228 below the water pump impeller 642 or below the lower compartment 6226. The driving element 662 of the magnetic coupling 66 is at least positioned within the magnet compartment 6228. The driving element 662 is also coupled to the motor shaft 61 and rotates at same rotational speed as does the water pump impeller 642. The driven element 664 is coupled to the refrigerant pump 68 by a shaft 666.

The refrigerant pump 68 is coupled to the second housing portion 624 and is operable to pump refrigerant. The refrigerant pump 68 is driven by the motor shaft 61 which rotates the magnetic coupling 66. Because of the magnetic field between the driving element 662 and the driven element 664, the driven element 664 may rotate with the driving element 662 at the same rotational speed. The water pump 64 and the refrigerant pump 68 may be driven at the same speed as the speed of the motor 63.

It is noted that the magnetic coupling 66 in this implementation provides a non-contact transfer of torque/power from the water pump impeller 642 to the refrigerant pump 68 thereby eliminating the need for shaft sealing. The pressurized coolant will not leak from the first housing portion 622. In other implementation (not shown), the motor shaft 61 may be positioned through the first housing portion 622 and the second housing portion 624 and drive the refrigerant pump 68 directly.

The multi-pump apparatus 60 integrates the water pump 64 and the refrigerant pump 68 to simplify the structure of the cooling system 12, prevents a surge of the coolant in the coolant circuit 40, and provides an improved pumping condition.

Figure 5:
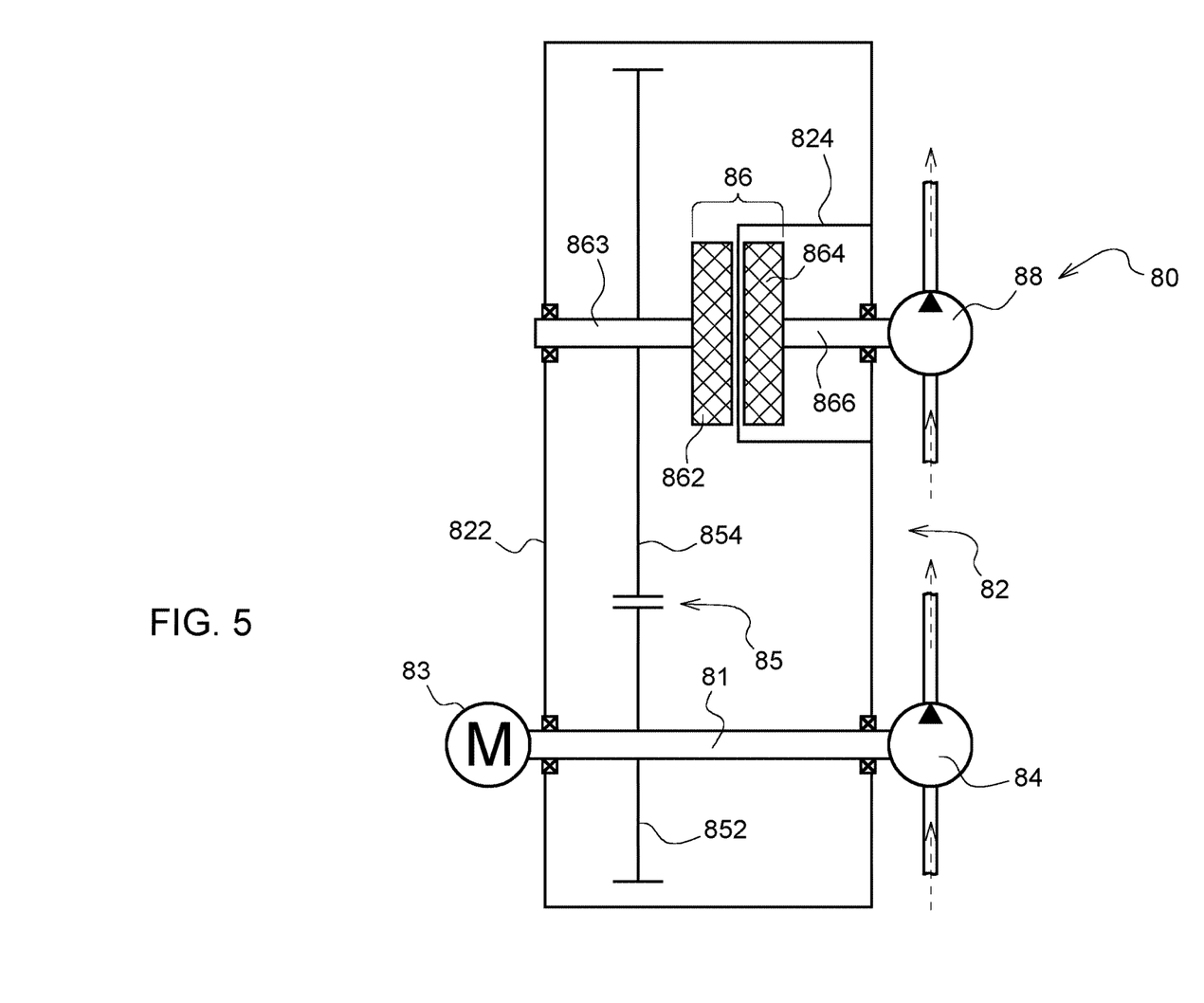
FIG. 5 is a cross-sectional view illustrating a multi-pump apparatus in another implementation.

Referring to FIG. 5, a multi-pump apparatus 80 which integrates a water pump 84 and a refrigerant pump 88 is also introduced. The multi-pump apparatus 80 may include a motor shaft 81, a main housing 82, the water pump 84, a gear set 85, and a refrigerant pump 88. The main housing 82 includes a first housing portion 822 and a second housing portion 824 coupled to the first housing portion 822. The water pump 84 is coupled to the first housing portion 822 and is operable to pump coolant. The refrigerant pump 88 is coupled to the second housing portion 824 and is operable to pump refrigerant and driven by the motor shaft 81. The multi-pump apparatus 80 may be coupled to or include a motor 83 rotating the motor shaft 81. The motor 83 in this implementation is an electric motor.

The motor shaft 81 is positioned through the first housing portion 822 and drives the refrigerant pump 88 directly. The gear set 85 is coupled to the motor shaft 81 and to the refrigerant pump 88. In some situations, the water pump 84 and the refrigerant pump 88 may need to rotate at different rotational speeds and the gear set 85 may be used to satisfy this need. For example, the water pump 84 may need to go faster than refrigerant pump 88. In this implementation, the gear set 85 includes a first gear 852 coupled to or fixed to the motor shaft 81. The gear set 85 also includes a second gear 854 meshed with the first gear 852 and is coupled to the refrigerant pump 88 by shafts 863, 866. The first gear 852 has a first diameter and the second gear 854 has a second diameter greater than the first diameter of the first gear 852 such that the speed of the refrigerant pump 88 is slower than the speed of the water pump 84.

For example, if the speed range of the refrigerant pump 88 is 800-1600 rpm (revolutions per minute) and the speed range of the water pump 84 is 2000-4000 rpm, the second diameter of the second gear 854 is 2.5 times greater than the first diameter of the first gear 852. Because of the 2.5:1 speed reduction configuration, the motor shaft 81 can drive the water pump 84 directly and can drive the refrigerant pump 88 indirectly with a lower speed. The number of the gears and the gear ratio described herein are only for illustration. Depending on needs of different speed ratio or rotational speed direction, the number of the gears and the diameter thereof may vary. For instance, the gear set 85 may have another gear (not shown) meshed between the first gear 852 and the second gear 854 to make them rotate in opposite directions.

The multi-pump apparatus 80 may include a magnetic coupling 86 operable to transfer a portion of a power from the second gear 854 through the shafts 863 866 to the refrigerant pump 88. The magnetic coupling 86 includes a driving element 862 coupled to the second gear and positioned within the first housing portion 822. The magnetic coupling 86 also includes a driven element 864 coupled to the refrigerant pump 88 and positioned within the second housing portion 824. The driven element 864 rotates with the driving element 862.

It is noted that the magnetic coupling 86 in this implementation provides a non-contact transfer of torque/power from the second gear 854 to the refrigerant pump 68 thereby eliminating the need for shaft sealing. In other implementation (not shown), the shafts 863 866 are connected as a single shaft and is positioned through the first housing portion 822 and the second housing portion 824 and drive the refrigerant pump 88 directly.

Without in any way limiting the scope, interpretation, or application of the claims appearing below, a technical effect of one or more of the example embodiments disclosed herein is to combine the water (antifreeze) pump and the refrigerant pump such that the water pump and the refrigerant pump are driven by the motor shaft. Another technical effect of one or more of the example embodiments disclosed herein is to sink the water pump inside the first housing portion (pressurized surge tank) with coolant make a good condition for operation. Another technical effect of one or more of the example embodiments disclosed herein is to provide multi-pump apparatus of which the water pump and the refrigerant pump can rotate at different rotational speeds. Another technical effect of one or more of the example embodiments disclosed herein is to provide multi-pump apparatus applied to a cooling system having multiple heat exchange circuits so as to simplify the cooling system.

As used herein, unless otherwise limited or modified, lists with elements that are separated by conjunctive terms (e.g., "and") and that are also preceded by the phrase "at least one of" or "one or more of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C)

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A multi-pump apparatus of a work vehicle, comprising:
    a main housing having a first housing portion and a second housing portion coupled to the first housing portion;
    a motor shaft positioned through the first housing portion;
    a water pump coupled to the first housing portion and operable to pump coolant and driven by the motor shaft; and
    a refrigerant pump coupled to the second housing portion and operable to pump refrigerant and driven by the motor shaft;
    wherein the water pump includes a water pump impeller driven by the motor shaft, the first housing portion includes an upper compartment and a lower compartment under the upper compartment, with the coolant communicating between the upper compartment and the lower compartment, and the upper compartment is operable to receive the coolant from a water pump inlet to increase a fluid pressure.

2. The multi-pump apparatus of a work vehicle set forth in claim 1, wherein the first housing portion and the second housing portion are arranged in a vertical orientation and the motor shaft rotates about an axis parallel to the vertical orientation.

3. The multi-pump apparatus of a work vehicle set forth in claim 1, wherein the water pump impeller is positioned within the lower compartment and rotates with the motor shaft to discharge the coolant.

4. The multi-pump apparatus of a work vehicle set forth in claim 3, wherein the water pump impeller is submerged in the coolant.

5. The multi-pump apparatus of a work vehicle set forth in claim 1, further comprising a baffle positioned between the upper compartment and the lower compartment so as to control a communication of the coolant between the upper compartment and the lower compartment.

6. The multi-pump apparatus of a work vehicle set forth in claim 1, further comprising a pressure cap coupled to the upper compartment.

7. The multi-pump apparatus of a work vehicle set forth in claim 1, wherein the water pump impeller driven is directly connected to the motor shaft.

8. The multi-pump apparatus of a work vehicle set forth in claim 1, wherein the motor shaft is extended from a motor, and the motor is positioned outside the first housing portion.

9. The multi-pump apparatus of a work vehicle set forth in claim 1, the upper compartment includes the water pump inlet, and the lower compartment includes a water pump outlet for the coolant flowing out therefrom.

10. A cooling system for a work vehicle, comprising:
    a multi-pump apparatus, including:
        a main housing having a first housing portion and a second housing portion coupled to the first housing portion;
        a motor shaft positioned through the first housing portion;
        a water pump coupled to the first housing portion and operable to pump coolant and driven by the motor shaft; and
        a refrigerant pump coupled to the second housing portion and operable to pump refrigerant and driven by the motor shaft, wherein the water pump includes a water pump impeller driven by the motor shaft, the first housing portion includes an upper compartment and a lower compartment under the upper compartment, with the coolant communicating between the upper compartment and the lower compartment, and the upper compartment is operable to receive the coolant from a water pump inlet to increase a fluid pressure;
    a pressure reducer receiving the refrigerant from the refrigerant pump and operable to reduce the pressure of the refrigerant so as to decrease the temperature thereof;
    a primary heat exchanger having a first unit and a second unit, wherein the first unit is operable to receive the refrigerant from the pressure reducer;
    a condenser positioned downstream of the first unit of the primary heat exchanger and operable to cool the refrigerant into liquid form; and
    a vehicle component receiving the coolant from the water pump to discharge heat;
    wherein the second unit of the primary heat exchanger is positioned downstream of the vehicle component and is operable to absorb heat from the vehicle component and to discharge heat to the first unit of the primary heat exchanger.

11. A multi-pump apparatus of a work vehicle, comprising:
    a main housing having a first housing portion and a second housing portion coupled to the first housing portion;
    a motor shaft positioned through the first housing portion;

a water pump coupled to the first housing portion and operable to pump coolant and driven by the motor shaft; and a refrigerant pump coupled to the second housing portion and operable to pump refrigerant and driven by the motor shaft;

wherein the water pump includes a water pump impeller driven by the motor shaft, the first housing portion includes an upper compartment and a lower compartment under the upper compartment, the upper compartment is operable to receive the coolant from a water pump inlet to increase a fluid pressure, and the upper compartment and a surface of the coolant defines a space within the upper compartment, when the motor shaft rotates, a temperature of the first housing portion increases and an air pressure of the space increases.

* * * * *